Patented July 29, 1924.

1,503,429

UNITED STATES PATENT OFFICE.

WILLIAM FRASER RUSSELL, OF NORWALK, CONNECTICUT, ASSIGNOR TO THE NORWALK TIRE AND RUBBER COMPANY, OF NORWALK, CONNECTICUT, A CORPORATION OF CONNECTICUT.

PROCESS OF ACCELERATING THE VULCANIZATION OF NATURAL OR ARTIFICIAL INDIA RUBBER OR RUBBERLIKE SUBSTANCES.

No Drawing. Application filed August 4, 1919. Serial No. 315,306.

*To all whom it may concern:*

Be it known that I, WILLIAM FRASER RUSSELL, a subject of the King of England, residing at Norwalk, in the county of Fairfield and State of Connecticut, have invented new and useful Improvements in Processes of Accelerating the Vulcanization of Natural or Artificial India Rubber or Rubberlike Substances, of which the following is a specification.

This invention has for its object improvements in the process of vulcanizing india rubber and aims to effect such improvements by vulcanizing in the presence of organic substances or compounds free from all the well known disadvantages associated with the organic accelerators at present in use.

As is well known, many basic organic substances have recently been mentioned in the literature of the art for accelerating the vulcanization of rubber. The advantage gained by using these substances lies in the fact that they are, generally speaking, much more active, weight for weight, than the so-called inorganic accelerators and consequently can be used in relatively much smaller quantities than the latter.

It is also generally known in the art that all of these organic accelerators in practical use in the industry at the present time are open to objections on various grounds. Practically all of them have toxic or poisonous properties which manifest themselves in the factory by causing skin affections or otherwise disturbing the health of the workers who come in contact with them directly or indirectly. As a result some of these agents cannot be used at all without serious inconvenience to the operators, while with others it is necessary to install expensive equipment to help overcome their poisonous effects when used in rubber manufacture.

It is also well known that many of these organic accelerators in use also give rise during the process of vulcanization, to volatile poisonous substances or pungent fumes, which cannot be overcome and which present a serious menace to their extensive use. It is also obvious that in many classes of goods such poisonous substances cannot or should not be used. Other organic accelerators already advocated in the art are highly colored or give rise to colored substances during vulcanization thereby rendering themselves unsuitable for use in many compounds or mixtures where whiteness or a specific color is the objective. It is therefore clear that an organic substance in order to be classed as a safe and suitable accelerator not only must produce the effect of accelerating vulcanization while enhancing the physical quality of the product, but also must be free from the particular drawbacks enumerated above.

I have made the important discovery that the substance urea which is itself non-toxic and absolutely harmless, and many basic aliphatic derivatives thereof of low toxicity, possess to a very marked degree the property of accelerating vulcanization, thereby producing vulcanized products of enhanced physical quality, while at the same time they are free from the technical drawbacks above mentioned.

Derivatives of urea which may be used within the scope of this invention are the alkyl derivatives of urea, such as methyl or ethyl urea; biuret, which is formed from urea by the action of heat, and semicarbazide, an open chain amino, derivative of urea.

Any of these substances or compounds when added in small quantities to india rubber or to a rubber compound or "mixing" prior to vulcanization, greatly shortens the time required for said vulcanization, producing well vulcanized products of good physical quality, entirely free from odor and discoloration. Moreover the stocks produced by using the above-mentioned substances or compounds are free from all poisonous action on the health of the workers.

In applying these substances in vulcanization I do not restrict myself to their use in the pure form alone. They can be applied not only in the pure state, either melted or powdered, but also in the crude or technical state. Further, they may be applied in the form of solutions of any desired strength, in any suitable solvent; for example, the aqueous solution of crude urea— that is the crude urea liquor obtained from the process of manufacture of this substance are very economical and advantageous. These solutions may be introduced into the rubber at any stage in the process of manufacture prior to vulcanization, the solvent disappearing by evaporation on the mill or being eliminated by any other suitable means.

To illustrate the manner in which urea or its basic aliphatic derivatives may be used to accelerate vulcanization, the following is an example:

(a) A mixture of 100 parts by weight of rubber, 5 parts by weight of sulphur and 0.5 parts by weight of urea will give a well-cured soft rubber product if vulcanized in a mould for 45 minutes at a temperature of 145°C. Without the addition of the urea the time of vulcanization would be 2 or 3 hours.

Another example is as follows:

(b) A mixture of 100 parts by weight of rubber, 40 parts by weight of sulphur and 2 parts by weight of urea will give a durable hard rubber if cured for two hours at a temperature of 145° C.

Another example is as follows:

(c) One part by weight of a 50% solution of urea in water, or its equivalent of the crude liquor or concentrate from the manufacture of this substance, is added on the mill to a mixture of 100 parts by weight of rubber and 5 parts by weight of sulphur. The water is evaporated during the process of milling leaving the urea in a finely divided state in the rubber mixing. The mixing will yield a well cured soft rubber product when vulcanized in a mould for 45 minutes at a temperature of 145° C.

Similar results are obtained if the rubber in these examples be replaced by other kinds of natural rubber, Para rubber or artificial rubber.

It will be seen from the foregoing that my improved method is directed to the use of either urea or substantially non-toxic, basic derivatives of urea for accelerating the sulphur-vulcanization of rubber or rubber "mixings". It will also be obvious that the practice of my improved method for accelerating vulcanization will eliminate the particular draw-backs which I have numerated above with reference to present methods of accelerating vulcanization.

What I claim is:

1. The process of accelerating the vulcanization of rubber which process consists in adding urea as an accelerator and sulphur to the rubber and subsequently heating this mixture to a vulcanizing temperature.

2. The process of accelerating the vulcanization of a rubber "mixing" which process consists in adding urea as an accelerator and sulphur to the "mixing" and subsequently heating this "mixing" to a vulcanizing temperature.

3. The process of accelerating the vulcanization of rubber which process consists in adding a substantially non-toxic, basic, derivative of urea as an accelerator and sulphur to the rubber and subsequently heating this mixture to a vulcanizing temperature.

4. The process of accelerating the vulcanization of rubber which process consists in adding a solution of urea as an accelerator and sulphur to the rubber, evaporating the solvent and subsequently heating this mixture to a vulcanizing temperature.

5. The process of accelerating the vulcanization of rubber which process consists in adding a solution of crude urea as an accelerator and sulphur to the rubber, evaporating the solvent, and subsequently heating this mixture to a vulcanizing temperature.

6. The process of accelerating the vulcanization of rubber which process consists in adding crude urea liquor as an accelerator and sulphur to the rubber, evaporating the solvent, and subsequently heating this mixture to a vulcanizing temperature.

7. The process of accelerating the vulcanization of rubber which process consists in adding urea in an amount not to exceed three parts by weight to each 100 parts by weight of rubber, and sulphur and subsequently heating this mixture to a vulcanizing temperature.

8. As an article of manufacture, a vulcanized rubber product containing urea.

9. As an article of manufacture, a vulcanized rubber product containing a substantially non-toxic basic derivative of urea.

This specification signed and witnessed this 25th day of July A. D., 1919.

WILLIAM FRASER RUSSELL.